United States Patent [19]

Matsumoto et al.

[11] 4,263,602
[45] Apr. 21, 1981

[54] CONSTANT FLOW RATE LIQUID SUPPLY PUMP

[75] Inventors: Masafumi Matsumoto; Matahira Kotani, both of Nara, Japan

[73] Assignee: Sharp Kabushiki Kaisha, Osaka, Japan

[21] Appl. No.: 97,389

[22] Filed: Nov. 26, 1979

[51] Int. Cl.³ ............ G01D 15/18; G01F 11/30; F04B 23/00; F04B 41/00
[52] U.S. Cl. .................. 346/140 R; 346/75; 222/318; 417/503; 417/521
[58] Field of Search ............ 346/140 R, 75; 222/136, 222/137, 318, 386.5; 417/390, 503, 521

[56] References Cited
U.S. PATENT DOCUMENTS

| | | | |
|---|---|---|---|
| 862,867 | 8/1907 | Eggleston | 417/390 |
| 1,605,832 | 11/1926 | Garhart | 222/137 |
| 3,139,156 | 6/1964 | Urso | 417/521 X |
| 3,765,802 | 10/1973 | Leitermann et al. | 417/503 X |
| 4,053,902 | 10/1977 | Skafvenstedt et al. | 346/140 R |
| 4,073,408 | 2/1978 | Hartwig | 222/318 X |
| 4,079,384 | 3/1978 | Takano et al. | 346/140 R |
| 4,204,215 | 5/1980 | Nakarai | 346/140 R |

Primary Examiner—George H. Miller, Jr.
Attorney, Agent, or Firm—Birch, Stewart, Kolasch & Birch

[57] ABSTRACT

An ink liquid supply system for an ink jet system printer comprises an ink liquid reservoir for containing ink liquid therein, and a constant flow rate pump for supplying the ink liquid to a nozzle. The constant flow rate pump comprises a cylinder block, a piston disposed in the cylinder block, and a diaphragm secured to one end of the piston. A first pressure chamber is defined by the other end of the piston, and a second pressure chamber is defined by the diaphragm. In response to the reciprocating movement of the piston, the first pressure chamber functions to introduce the ink liquid from the ink liquid reservoir and to develop the ink liquid of a constant flow rate to the nozzle. At the same time, the second pressure chamber functions to introduce a waste ink liquid from a beam gutter of the ink jet system printer and to return the waste ink liquid to the ink liquid reservoir.

7 Claims, 3 Drawing Figures

CONSTANT FLOW RATE LIQUID SUPPLY PUMP

BACKGROUND AND SUMMARY OF THE INVENTION

The present invention relates to an ink liquid supply system for an ink jet system printer of the charge amplitude controlling type and, more particularly, to a constant flow rate pump for use in the ink liquid supply system.

A constant flow rate ink liquid supply pump is highly required in an ink jet system printer of the charge amplitude controlling type to ensure an accurate printing. In addition, in an ink jet system printer of the charge amplitude controlling type, ink droplets not contributing to an actual printing operation are collected by a beam gutter and returned to an ink liquid supply system for recirculation purposes. Therefore, a reliable recirculation system is required in the ink jet system printer of the charge amplitude controlling type.

In the conventional ink jet system printer of the charge amplitude controlling type, a constant pressure ink liquid supply pump is employed, wherein the mass of the ink droplets and the velocity of the ink droplets emitted from a nozzle are variable depending on the ink characteristics such as the viscosity. These variations will provide a distortion on the printed character. Moreover, in the conventional ink jet system printer of the charge amplitude controlling type, the ink recovery is conducted through the use of the gravity. Accordingly, the ink liquid recirculation is not stable when the viscosity or the surface tension of the ink liquid varies.

Accordingly, an object of the present invention is to provide a constant flow rate pump for use in an ink liquid supply system of an ink jet system printer of the charge amplitude controlling type.

Another object of the present invention is to provide a constant flow rate pump of small size.

Still another object of the present invention is to provide a small pump which integrally includes a pressure chamber for supplying the ink liquid to a nozzle and another pressure chamber for introducing waste ink liquid from a beam gutter of the ink jet system printer of the charge amplitude controlling type.

Yet another object of the present invention is to provide a novel ink liquid sypply system in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a pump integrally includes two pressure chambers, one being determined by one end of a piston, and the other being determined by a diaphragm secured to the other end of the piston. The first pressure chamber functions to introduce the waste ink liquid collected by a beam gutter of the ink jet system printer of the charge amplitude controlling type. The second pressure chamber functions to develop the ink liquid toward a nozzle of the ink jet system printer of the charge amplitude controlling type at a constant flow rate.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
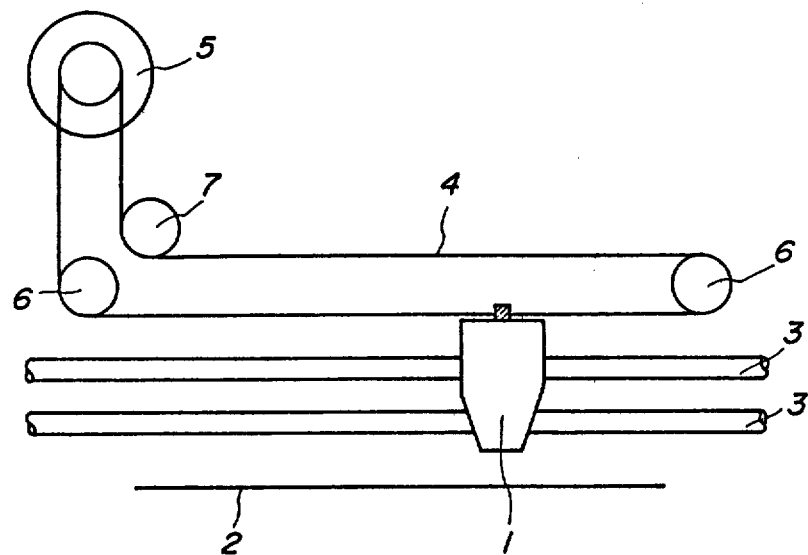
FIG. 1 is a schematic play view of a carriage drive mechanism of an ink jet system printer of the charge amplitude controlling type.

FIG. 1 schematically shows a carriage drive mechanism of an ink jet system printer of the charge amplitude controlling type.

A printer head 1 is slidably mounted on guide rails 3, and driven to travel along a print receiving paper 2. A drive mechanism comprises a pulse motor 5 (or a DC servomotor) and a drive wire 4 (or a belt) extended between pulleys 6, a tension pulley 7 and the pulse motor 5. The drive wire 4 is fixed to the printer head 1 at a desired position, thereby reciprocating the printer head 1.

Figure 2:
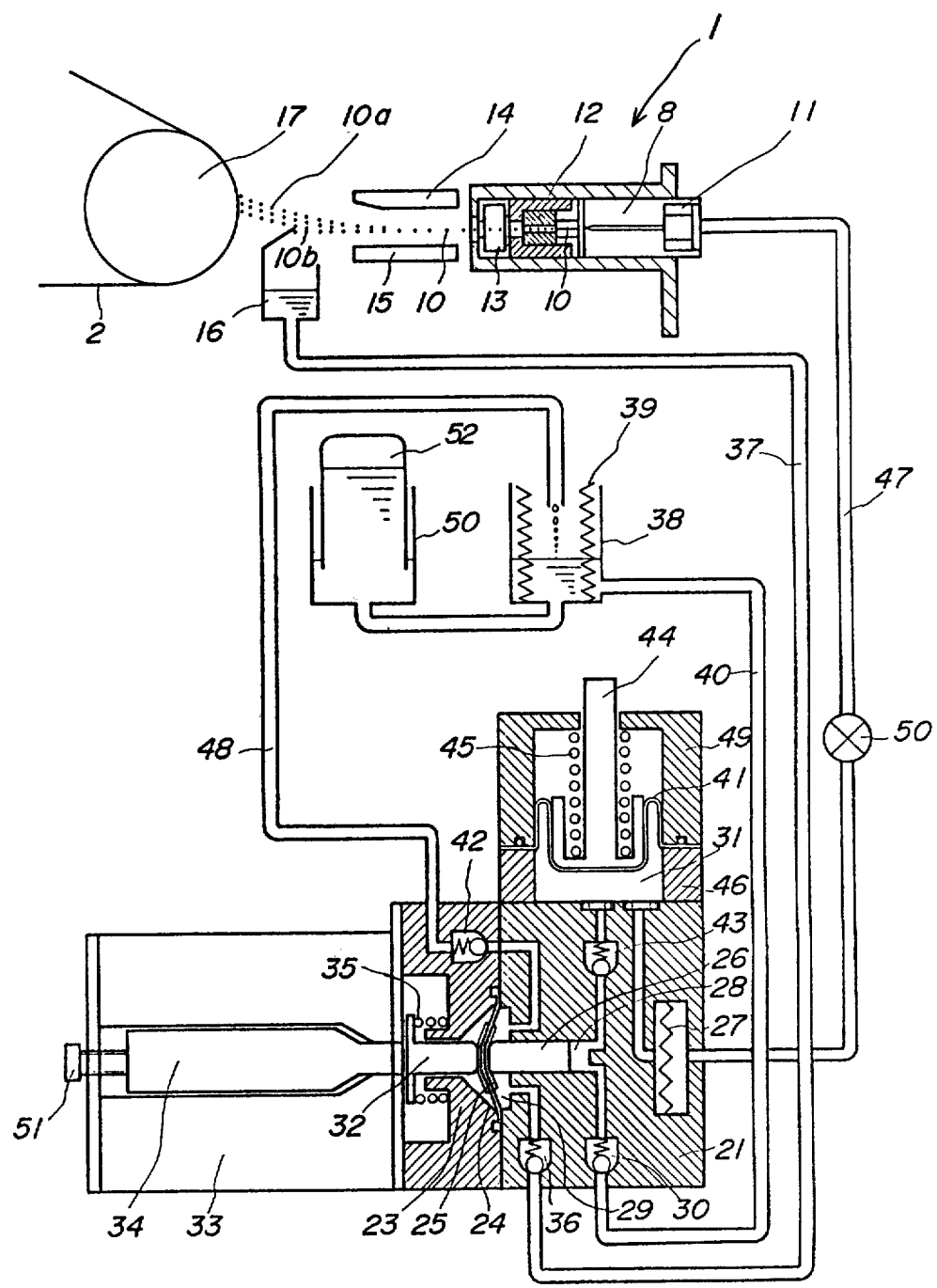
FIG. 2 is a block diagram of an ink liquid supply system for an ink jet system printer including an embodiment of a constant flow rate pump of the present invention.

FIG. 2 shows an ink liquid supply system for an ink jet system printer including a embodiment of a constant flow rate pump of the present invention.

The printer head 1 comprises a nozzle 8 for emitting an ink liquid supplied from the ink liquid supply system. An electromechanical transducer 11 is attached to the nozzle 8 to vibrate the nozzle 8 at a given frequency, thereby forming ink droplets 10 at the given frequency. The thus formed ink droplets 10 are selectively charged through the use of a charging tunnel 12 in accordance with a print information signal. A sensing electrode 13 is disposed in front of the charge tunnel 12 to detect whether the ink droplets 10 are accurately charged. An output signal of the sensing electrode 13 is used for synchronizing the application of the charging signal to the charging tunnel 12 with the droplet formation rhythm as is well known in the art.

The thus charged ink droplets 10 are deflected while they pass through a constant high voltage electric field established by a pair of deflection electrodes 14 and 15 in accordance with charge amplitudes carried thereon. Deflected ink droplets 10a are directed to the record receiving paper 2 which is supported by a platen 17. Ink droplets 10b not contributing to the actual printing operation are not charged and directed to a beam gutter 16 for recirculation purposes.

The deflection electrodes 14 and 15, and the beam gutter 16 can be incorporated in the printer head 1. The deflection caused by the deflection electrodes 14 and 15 is effected in the vertical direction, and the printer head 1 is driven to travel in the lateral direction, whereby desired patterns are formed on the record receiving paper 2 in the dot matrix fashion.

The ink liquid collected by the beam gutter 16 is returned to the ink liquid supply system through a conduit 37. The thus returned ink liquid is introduced into a constant flow rate pump, which develops the ink liquid of a fixed flow rate to be applied to the nozzle 8 through a conduit 47. The constant flow rate ink liquid is highly required to ensure an accurate printing or to stabilize the droplet formation.

The constant flow rate pump mainly comprises two coaxial cylinder blocks 21 and 23, two coaxial pistons 26 and 32, and a diaphragm 24 interposed between the pistons 26 and 32. A first pressure chamber 28 is defined by the cylinder block 21 and the piston 26. A second pressure chamber 29 is defined by the cylinder block 21, the piston 26, and the diaphragm 24. Pressure in the chambers 28 and 29 is varied in response to the reciprocating movement of the coaxial pistons 26 and 32, and the diaphragm 24.

More specifically, the diaphragm 24 is supported by a reinforcing member 25, and secured to the piston 32 through the use of the piston 26 and the reinforcing member 25. The periphery of the diaphram 24 is fixed between the cylinder blocks 21 and 23. When the piston 32 is driven to reciprocate, the diaphragm 24 and the piston 26 are moved in unison with the movement of the piston 32.

The piston 32 is connected to a plunger 34 which is associated with a DC solenoid 33. The DC solenoid 33 creates the rightward movement of the piston 32. A spring 35 is disposed between the cylinder block 23 and a flange portion of the piston 32 to provide the leftward movement of the piston 32. An adjusting screw 51 is provided for adjusting the stroke length of the plunger 34. That is, the adjusting screw 51 is used for adjusting the flow rate of the ink liquid developed from the constant flow rate pump. The flow rate can alternatively be modified by changing a frequency of an activating signal to be applied to the DC solenoid 33.

The second pressure chamber 29 is communicated to the conduit 37 via an inlet valve 36 in order to introduce the ink liquid collected by the beam gutter 16. The thus introduced ink liquid is returned to a recovering tank 38 through an outlet valve 42 and a conduit 48. The recovering tank 38 stores the collected, returned ink liquid and a fresh ink liquid supplied from an ink liquid reservoir 50 including an ink liquid cartridge 52. A filter 39 is disposed in the recovering tank 38. The ink liquid stored in the recovering tank 38 is supplied to the first pressure chamber 28 through a conduit 40 and an inlet valve 30.

An outlet valve 43 is provided for the first pressure chamber 28 to develop an ink liquid of a constant flow rate toward a pressure accumulator 31. The pressure accumulator 31 comprises a cylinder 49, a resilient member 41, for example, a bellows or a diaphragm, a cap 44, and a spring 45. The periphery of the resilient member 41 is secured to the cylinder 49, and the resilient member 41 is biased downward through the use of the spring 45 and the cap 44. The pressure accumulator 31 functions to absorb variations in the flow rate. The ink liquid of a contant flow rate, which does not include pulsation, derived from the pressure accumulator 31 is supplied to the nozzle 8 through a filter 27, an electromagnetic valve 50, and the conduit 47.

When the plunger 34 is driven to travel rightward by the DC solenoid 33, the pistons 32 and 26 and the diaphragm 24 travel rightward. At this moment, the pressure in the first pressure chamber 28 is increased, whereby the ball valve in the outlet valve 43 is pushed upward against the spring to develop the ink liquid toward the pressure accumulator 31. At the same time, the pressure in the second pressure chamber 29 is also increased, the ball valve in the outlet valve 42 is pushed leftward in FIG. 2 against the spring to develop the ink liquid toward the recovering tank 38 through the conduit 48.

When the plunger 34 has been shifted right by a predetermined length, the DC solenoid 33 is deenergized. Then, the pistons 32 and 26, and the plunger 34 are moved leftward due to the retaining strength of the spring 35 till the plunger 34 contacts the tip end of the adjusting screw 5.

While the pistons 32 and 26, and the diaphragm 24 travel leftward, a negative pressure is created in the first pressure chamber 28, whereby the ball valve in the inlet valve 30 is pushed upward against the spring to introduce the ink liquid from the recovering tank 38 through the conduit 40. The ink liquid amount introduced from the recovering tank 38 and supplied to the nozzle 8 is determined by the shift length of the piston 26 and its reciprocating frequency. At the same time, the negative pressure is also created in the second pressure chamber 29, whereby the ball valve in the inlet valve 36 is pushed upward against the spring to introduce the waste ink liquid collected by the beam gutter 16 through the conduit 37.

The above-mentioned operation is repeated to supply the ink liquid of a constant flow rate to the nozzle 8, and to effectively recover the ink liquid not contributing to the actual printing operation.

Figure 3:
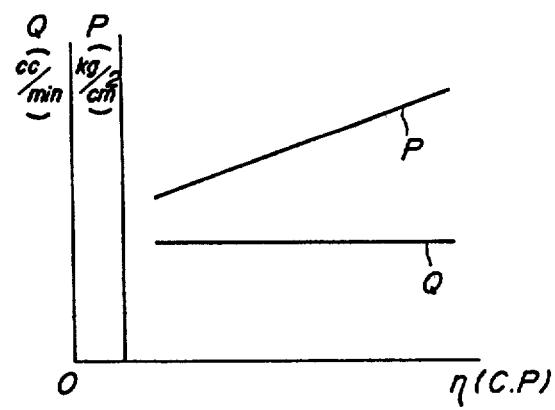
FIG. 3 is a graph showing pressure and flow rate versus ink liquid viscosity characteristics of ink liquid used in an ink liquid supply system of the present invention.

FIG. 3 shows the relationship between the ink liquid viscosity $\eta$ (along the abscissa axis), and the flow rate Q and the pressure P (along the ordinate axis) of the ink liquid supplied to the nozzle 8.

The ink liquid viscosity $\eta$ inevitably varies when the temperature varies or the solvent for the ink volatilizes. The variation of the ink liquid viscosity $\eta$ will cause the vibration of the fluid resistance at the nozzle 8. However, when the fluid resistance varies, the pressure in the pressure accumulator 31 varies in response thereto and, therefore, the flow rate Q is held at the constant value. The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet system printer, said ink jet system printer comprising a nozzle for emitting an ink liquid supplied from said ink liquid supply system and a beam gutter for collecting waste ink dropets emitted from said nozzle and for recovering the ink liquid toward said ink liquid supply system, said ink liquid supply system comprising:

an ink liquid reservoir for containing the ink liquid therein; and a constant flow rate pump comprising:
  a cylinder block;
  a piston disposed in said cylinder block;
  a first pressure chamber defined by said cylinder block and one end of said piston;
  a resilient member secured to the other end of said piston;
  a second pressure chamber defined by said cylinder block, said piston and said resilient member;

drive means for reciprocating said piston within said cylinder block;

a first inlet valve communicated to said first pressure chamber and to a first conduit connected to said ink liquid reservoir for introducing the ink liquid from said ink liquid reservoir into said first pressure chamber when said piston is driven to travel in a predetermined direction; a first outlet valve communicated to said first pressure chamber and to a second conduit connected to said nozzle for developing the ink liquid from said first pressure chamber toward said nozzle when said piston is driven to travel in a direction counter to said predetermined direction;

a second inlet valve communicated to said second pressure chamber and to a third conduit connected to said beam gutter for introducing the waste ink liquid from said beam gutter into said second pressure chamber when said piston is driven to travel in said predetermined direction; and a second outlet valve communicated to said second pressure chamber and to a fourth conduit connected to said ink liquid reservoir for developing the waste ink liquid from said second pressure chamber toward said ink liquid reservoir when said piston is driven to travel in said direction counter to said predetermined direction.

2. The ink liquid supply system of claim 1, further comprising a pressure accumulator disposed between said first outlet valve and said nozzle.

3. The ink liquid supply system of claim 2, further comprising filter means disposed between said pressure accumulator and said nozzle.

4. The ink liquid supply system of claim 3, further comprising an electromagnetic valve disposed between said filter means and said nozzle.

5. The ink liquid supply system of claim 1, 2, 3 or 4, wherein said constant flow rate pump further comprising an adjusting screw for determining a travel length of said piston within said cylinder block.

6. The ink liquid supply system of claim 1, 2, 3 or 4, wherein said drive means comprises:

a plunger connected to said the other end of said piston;

a DC solenoid for shifting said plunger in said direction counter to said predetermined direction when said DC solenoid is energized; and spring means for biasing said piston in said predetermined direction.

7. The ink liquid supply system of claim 6, wherein said resilient member comprises a diaphragm, the periphery of said diaphragm being fixed to said cylinder block.

* * * * *